United States Patent
Zamsky et al.

(10) Patent No.: US 7,401,045 B2
(45) Date of Patent: Jul. 15, 2008

(54) METHOD FOR ADMINISTERING A CREDIT CARD WITH A FINANCE CHARGE WAIVER PERIOD

(75) Inventors: Michael Zamsky, Arlington, VA (US); Catherine Leicester Ogle, Powhatan, VA (US); Janet M. Mitro, Richmond, VA (US); Vijesh V. Iyer, Richmond, VA (US); Kevin Dale Kingston, Richmond, VA (US); Derrick Joseph, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 1591 days.

(21) Appl. No.: 09/797,678

(22) Filed: Mar. 5, 2001

(65) Prior Publication Data

US 2002/0165808 A1   Nov. 7, 2002

(51) Int. Cl.
*G06Q 40/00* (2006.01)
(52) U.S. Cl. .............................. 705/37; 705/36; 705/35; 705/26
(58) Field of Classification Search .................. 705/41, 705/14, 37, 38, 36, 39, 68, 70, 35, 42, 26; 395/214
See application file for complete search history.

(56) References Cited

U.S. PATENT DOCUMENTS

| | | | |
|---|---|---|---|
| 5,734,838 A * | 3/1998 | Robinson et al. ............... | 705/14 |
| 5,933,817 A | 8/1999 | Hucal | |
| 5,991,745 A | 11/1999 | Kiritz | |
| 6,032,134 A | 2/2000 | Weissman | |
| 6,049,782 A * | 4/2000 | Gottesman et al. ........ | 705/36 R |
| 6,167,386 A * | 12/2000 | Brown .......................... | 705/37 |
| 6,243,691 B1 * | 6/2001 | Fisher et al. .................. | 705/37 |
| 6,266,651 B1 * | 7/2001 | Woolston ...................... | 705/27 |
| 6,353,811 B1 | 3/2002 | Weissman | |
| 6,615,189 B1 * | 9/2003 | Phillips et al. ................. | 705/41 |
| 6,915,277 B1 * | 7/2005 | Manchester et al. ........... | 705/39 |
| 2002/0063153 A1 | 5/2002 | Stack et al. | |

OTHER PUBLICATIONS

The Southland Firestorm: A Social Report The Recovery FINANCES Banks Offer Special Help on Loans and Fees; [Home Edition] Los Angeles Times (pre-1997 Fulltext). Los Angeles, Calif.: Nov. 6, 1993. p. 3.*
Convera Corporation Annouces Expected Financial Results for the First Quarter of FY 2002; Company Implements Program to Control Costs Business Editors/Hi-Tech Writers. Business Wire. New York: May 10, 2001. p. 1).*

* cited by examiner

*Primary Examiner*—Frantzy Poinvil
*Assistant Examiner*—Clement Graham
(74) *Attorney, Agent, or Firm*—Finnegan, Henderson, Farabow, Garrett & Dunner, LLP (57) ABSTRACT

Method and systems for administering a credit card account are disclosed. The method comprises defining a finance charge waiver period for each one or more debits to the credit account. For each debit, it is determined whether a finance charge waiver period associated with a debit has expired. Debits for which the finance charge waiver period has expired are added to a set of billed charges. Finance charges accrue against all debits for which finance charge waiver period has expired. Optionally, a customer may be provided with advance notice of debits for which the finance charge waiver period will soon be expiring.

40 Claims, 7 Drawing Sheets

METHOD FOR ADMINISTERING A CREDIT CARD WITH A FINANCE CHARGE WAIVER PERIOD

BACKGROUND OF THE INVENTION

1. Field of the Invention

The present invention generally relates to credit card products and the like. More particularly, the invention relates to systems and methods for administering a credit card account having a finance charge waiver period.

2. Background and Material Information

A credit card is a financial product that is most commonly represented by a plastic card-like member. Credit cards are generally issued by a bank and provide a mechanism by which an authorized cardholder purchases goods or services without an immediate, direct exchange of cash. With each purchase, a cardholder thereby incurs debt which he or she may thereafter (i.e., upon receipt of a monthly or otherwise periodic statement) fully pay the outstanding balance or, as a matter of necessity or choice, defer at least a portion of the balance for later payment with accompanying interest or finance charges for the period during which payment of the outstanding debt is deferred.

The spending power (i.e., the total amount of funds available to the cardholder at any particular time for making purchases and the like) of a credit card is typically limited to a particular amount (the "credit limit") predetermined by the issuer of the card. The size of the issuer-imposed credit limit is generally based on a number of nonexclusive factors, the most important of which are often the cardholder's earning capacity and credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance," while the remaining or available balance of the credit limit is typically called the "available balance" and reflects the dynamically adjusted current spending power of the credit card. The cardholder may increase the available balance, up to the credit limit, by paying to the issuer (or its representative) the entire outstanding balance or a fractional portion thereof.

Credit card accounts may provide cardholders a "grace period," typically comprising a period of 20-30 days following the end of a billing cycle. The grace period is the time period in which a cardholder may pay off new debits to the account without incurring interest charges. After the grace period has expired, the card issuer will charge the cardholder interest on the new debits. Typically, the grace period does not apply to cash advances or balance transfers.

Whether or not a grace period is used by a credit card issuer will control the way interest is applied to a credit card account. For credit card accounts with no grace period, the card issuer charges interest on purchases immediately and regardless of whether the cardholder has paid the previous balance in-full. In this case, interest calculations are based on an average daily balance including new purchases. However, for a credit card account with a typical grace period, interest is not charged on new purchases when: (1) the cardholder has paid his or her previous balance in-full; and (2) the cardholder pays a current balance before the expiration of the grace period. When these conditions are not met, a credit card issuer will normally charge interest immediately on the outstanding balance (including new charges) based on an average daily balance.

Therefore, grace periods have a significant effect on credit card billing procedures. Under most credit card administration methods, the grace period starts with the end of a billing cycle, wherein a billing cycle typically lasts 30 days. All purchases to the credit card account which occur within a billing cycle are generally lumped together for applying the grace period. Thus, for a billing cycle beginning on May 1 and ending on May 30, the grace period clock would begin on May 31. For a 25 day grace period, the grace period in this example would expire on June 24. After that date, the credit card issuer will begin to charge interest if the cardholder had not paid off all of the charges made between May 1 and May 30.

SUMMARY OF THE INVENTION

Consistent with the principles of the present invention, a system and method of administering a credit card account with a finance charge waiver period is disclosed. A finance charge waiver period is defined for each of one or more purchases or debits to the credit card account. For each debit, it is determined whether an associated finance charge waiver period has expired. Finance charges are accrued against all debits for which the finance charge waiver period has expired.

In addition, systems and methods consistent with the principles of the invention may determine, for each debit, whether a finance charge waiver period associated with a debit will expire during a next billing cycle. All debits for which the finance charge waiver period will expire during the next billing cycle are added to a set of billed charges. A cardholder may pay off each debit by the end of its associated finance charge waiver period without incurring any finance charges on the one or more debits. A cardholder's failure to pay off a debit before the end of its associated finance charge waiver period will result in finance charges based only on that debit.

Moreover, systems and methods consistent with the principles of the invention administer credit card accounts, wherein a billing cycle is defined that comprises a predetermined number of days and a finance charge waiver period is defined that comprises more than one billing cycle. A billing cycle group, including a set of debits to the account for a corresponding billing cycle, is grouped for each billing cycle. It is determined, for each billing cycle group, whether a finance charge waiver period associated with a billing cycle has expired. Billed charges are set based on debits in billing cycle groups for which the finance charge waiver period has expired. Finance charges also accrue against debits in billing cycle groups for which the finance charge waiver period has expired.

According to the principles of the invention, a billing cycle group, including a set of debits to the account for a corresponding billing cycle, may be grouped for each billing cycle that has not previously been billed. In such a case, it is determined, for each billing cycle group, whether a finance charge waiver period associated with a billing cycle will expire during a next billing cycle. Billed charges are set based on debits in billing cycle groups for which the finance charge waiver period will expire during the next billing cycle. An interest charge is calculated on a previous balance. A customer is billed for the previous balance, the interest charge, and the billed charges.

Still further, systems and methods consistent with the principles of the invention administer credit card account, wherein each account has a finance charge waiver period comprising more than one billing cycle. The system may comprise one or more virtual transaction repositories for holding transaction data each credit card transaction made during a corresponding billing cycle. Each virtual transaction repository may correspond to a billing cycle and be associated with a billing cycle closing date. The system may also comprise an outstanding balance repository for holding an outstanding balance. The outstanding balance comprises a total value of billable transactions plus interest and fees associated with the billable transactions. In addition, the system may include calculation means for calculating balances interest due and fees. The calculation means calculates a total value of newly billable transactions for each virtual transaction repository for which the finance charge waiver period will expire during a next billing cycle. The total value of newly billable transactions is added to the outstanding balance.

Systems consistent with the principles of the invention provide a system for administering a credit card account with a finance charge waiver period comprising more than one billing cycle is described. The system may include: a current transactions repository for holding raw transaction data for recent billing cycles; a customer payment master file repository for holding customer and billing data; a financial master files repository for holding credit card account parameters; and an unbilled billing cycle file repository for holding data from billing cycles for which the finance charge waiver period has not yet expired. The system may also comprise a billing computer comprising a billing application operatively connected to the current transactions repository, the customer payment master file repository, the financial master files repository, and the unbilled billing cycle file repository for calculating billed balances. Optionally, the financial master files repository may comprise an indicator for signifying whether or not a credit card account has a finance charge wavier period, the length of a finance charge waiver period, and the types of transaction for which the finance charge waiver period applies.

Additional features and aspects of the invention will be set forth in part in the description that follows, and in part will be obvious from the description, or may be learned by practice of the invention. The features and aspects of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various features and aspects of the invention and together with the description, serve to explain the principles of the invention.

In the drawings.

DESCRIPTION OF THE EMBODIMENTS

Reference will now be made in detail to the features and embodiments of the invention, examples of which are illustrated in the accompanying drawings. Wherever possible, the same reference numbers will be used throughout the drawings to refer to the same or like parts.

Generally, the present invention is directed to a system and method for administering a credit card account having a finance charge waiver period. A credit card account is disclosed wherein every purchase charged to the account is given a finance charge waiver period. This finance charge waiver period preferably extends for a time period comprising more than one billing cycle. For example, a finance charge waiver period may extend for two, three, four or more billing cycles. The method and system therefore account for posted charges that remain unbilled during the extended finance charge waiver period. Optionally, the finance charge waiver period may be applied differently to balance transfers and purchases. The system and method administer charges from the time they are posted to an account to the time at which they are billed to the customer.

In accordance with the principles of the invention, finance charges only accrue for a given charge after its associated finance charge waiver period has expired. This remains true even if an account holder fails to make a minimum payment or carries a balance of previously billed charges which have exceeded their associated finance charge waiver period.

Figure 1:
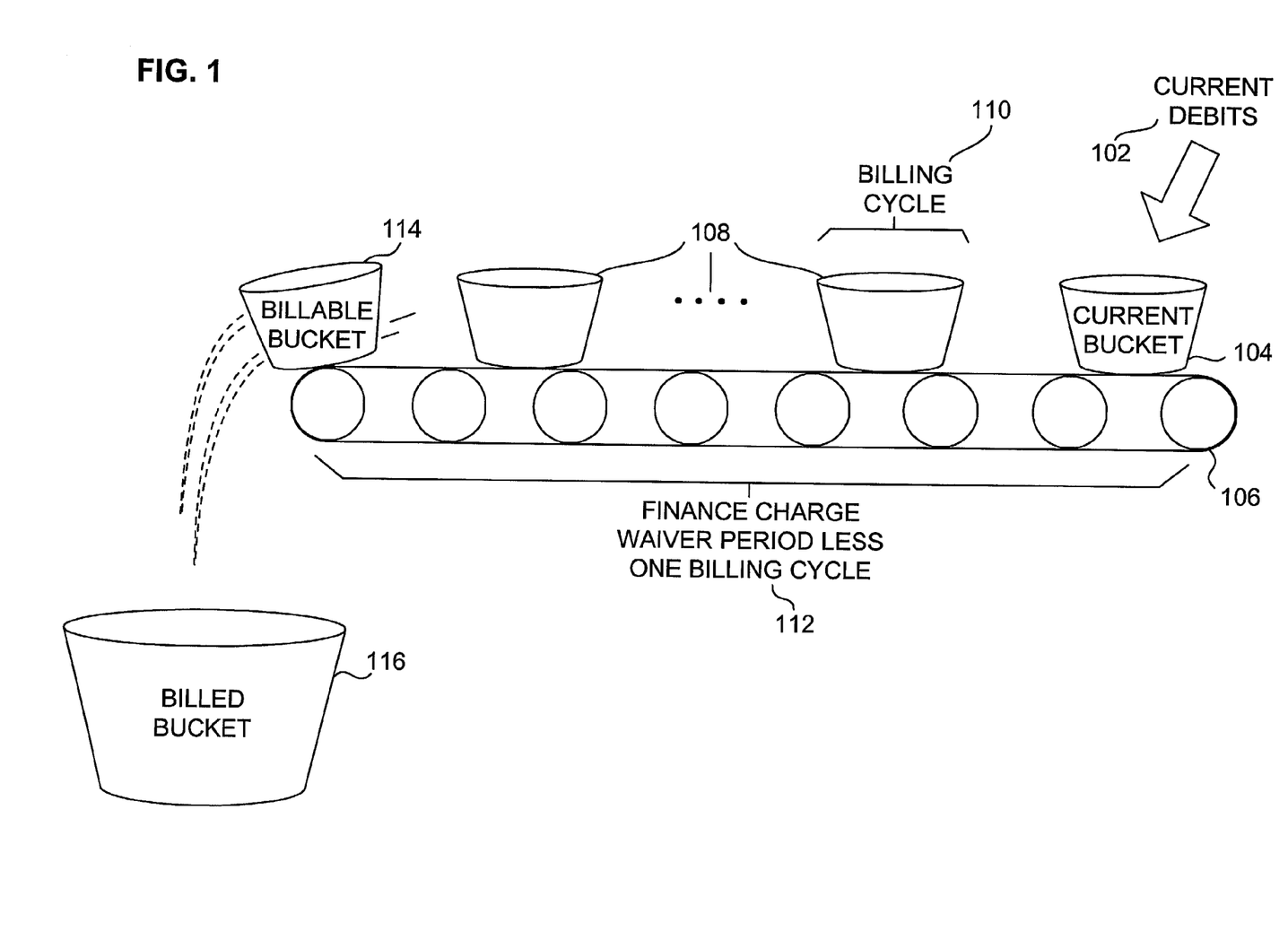
FIG. 1 is an illustration consistent with the principles of the present invention.

FIG. 1 is an illustration that demonstrates the administration of debits to a credit card account, consistent with the principles of the invention. As shown in FIG. 1, a set of current debits 102 is included in a current bucket 104 Current bucket 104 represents a repository for all account transactions occurring during a current billing cycle. Once a current billing cycle has expired, current bucket 104 moves down a conveyer belt 106 The belt 106 is an analogy for the length of a finance charge waiver period less one billing cycle, represented as a time period 112. When the current billing cycle has finished, current bucket 104 moves into the position of one of the stored buckets 108. Each stored bucket 108 represents a billing cycle 110.

Depending on the length of the time period 112, or by analogy, the length of conveyer belt 106, a number of stored buckets 108 may be stored or accommodated (i.e., unbilled during the finance charge waiver period). Once the finance charge waiver time period 112 has expired for a stored bucket 108, the bucket 108 moves down into the position of a billable bucket 114. Billable bucket 114 then falls off conveyer 106 into a billed bucket 116. This action signifies the fact that the finance charge waiver period for a set of debits associated with expired bucket 114 has expired. Alternatively, this may signify the fact that the finance charge waiver period for a set of debits associated with expired bucket 114 will expire at the end of the next billing cycle. In this way, the set of debits is billed to a customer so that they may be paid by the end of the finance charge waiver period.

Figure 2:
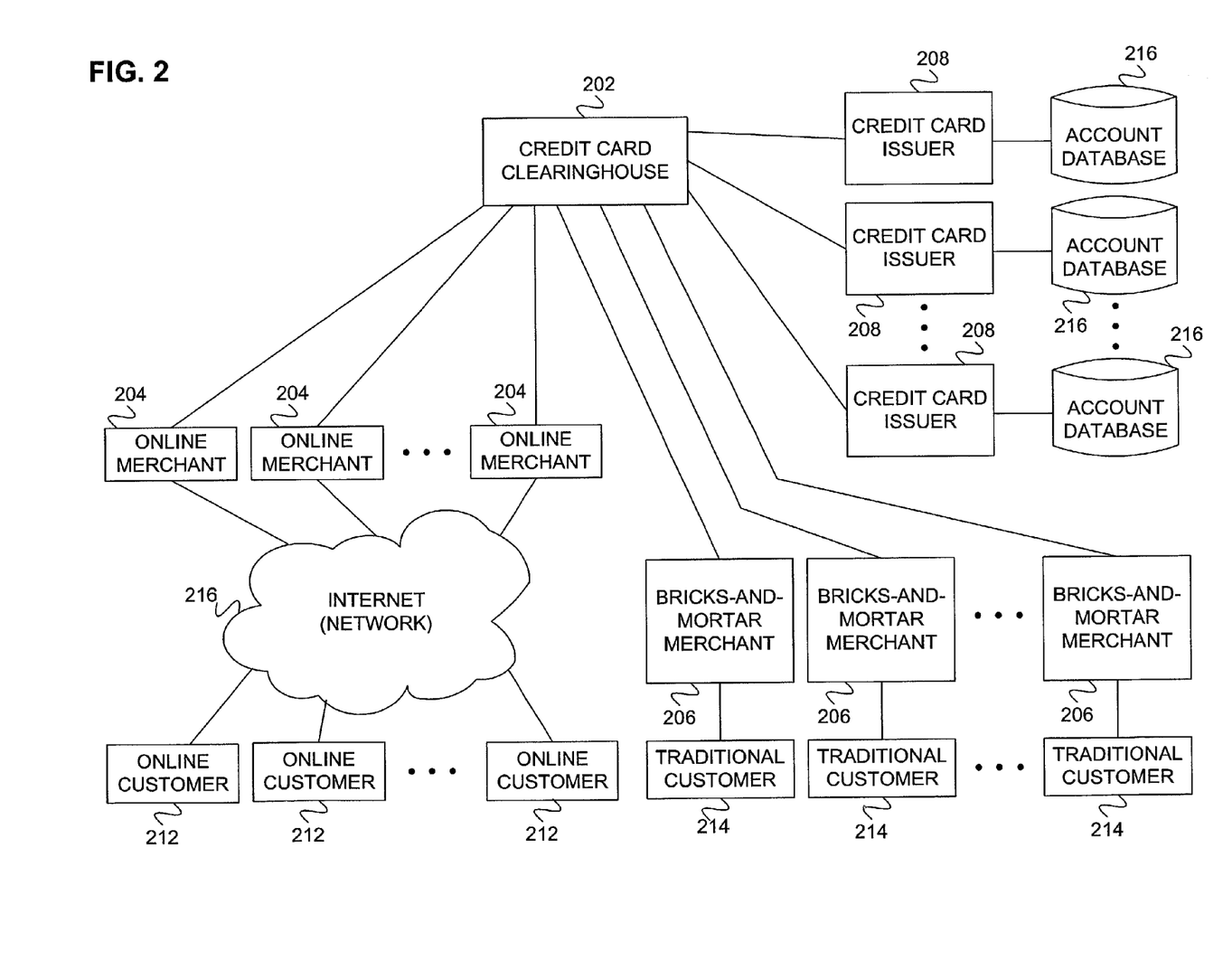
FIG. 2 is an exemplary diagram of a system environment.

FIG. 2 illustrates an exemplary system environment in which the features and aspect of the invention may be implemented. As illustrated in FIG. 2, a credit card clearinghouse 202 is operatively connected a plurality of online merchants 204, a plurality of bricks-and-mortar merchants 206, and a plurality of credit card issuers 208. Each of the plurality of online merchants 204 is operatively connected to the Internet 210, which acts as a conduit to a plurality of online customers 212. In this way, when an online customer 212 transacts business with an online merchant 204 via the Internet 210 and uses a credit card to tender payment, data related to the transaction may be transmitted to credit card clearinghouse 202. The transaction data is then passed to a corresponding credit card issuer 208, to authorize the credit card transaction made by customer 212.

The plurality of bricks-and-mortar merchants 206 similarly transmit all credit card tender purchases to credit card clearinghouse 202. Bricks-and-mortar merchants 206 generally comprise traditional, retail facilities with physical store locations. Thus, when a plurality of traditional customers 214 tender a credit card for payment in such retail establishments, data related to these transactions are transmitted to the credit card clearinghouse 202. Thereafter, the transaction data is passed to a corresponding credit card issuer 208, to authorize the credit card transaction made by customer 214.

Credit card clearinghouse 202 associates data for each of the transactions related to it with one of a plurality of credit card issuers 208, to which it is operatively connected. Credit card issuers 208 are typically banks or other financial institutions which perform account management, billing, and customer service functions for each individual credit card account. Thus, credit card clearinghouse 202 associates each of the plurality of online customers 212 and traditional customers 214 with his or her credit card issuer 208. In this way, data relating to each credit card transaction are transmitted to the proper credit card issuer 208 for recordation. Account data for customers are stored by each credit card issuer 208 in an account database 216.

Figure 3:
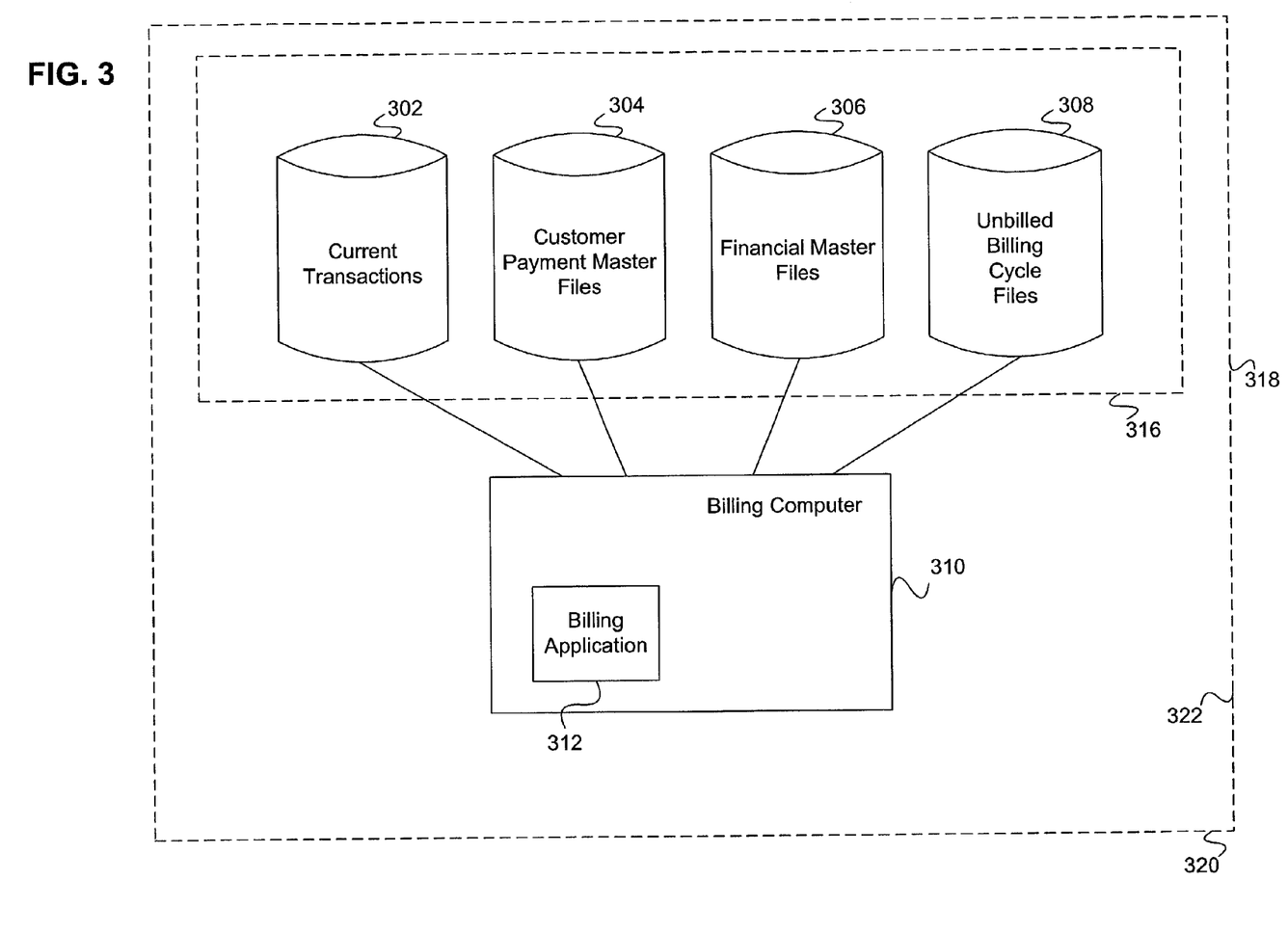
FIG. 3 is an exemplary diagram of a system in accordance with the present invention.

FIG. 3 illustrates an exemplary credit card issuer system 320 in accordance with the principles of the present invention. Credit card issuer system 320 includes a billing computer 310 and an account database 316. Billing computer 310 may be implemented by each credit card issuer 208 through a personal computer (PC), workstation and/or any other type of computing device. Account database 316 may be analogous to account database 216 in FIG. 2 and may be implemented through any combination of high density, storage devices.

As illustrated in FIG. 3, account database 316 includes a current transactions database 302, a customer payment master files database 304, a financial master files database 306, and an unbilled billing cycle files database 308 that are operatively connected to billing computer 310. Current transactions database 302 may comprise, for example, raw transaction data files for the past twelve or more billing cycles. As such, these files comprise listings of transactions including the date, amount, merchant, and the like for each transaction. Balance information for each account may be excluded from the current transactions database 302.

Customer payment master files 304 comprise data files for each of the card issuer's customers including, for example, customer names, addresses, outstanding balance, billed fees, billed finance charges, billed annual fees, billed debits and transactions, and the like. Financial master files database 306 comprises substantive billing information for each credit card account, including, for example, interest rate key files, annual fees to be charged, and finance charge calculation methodology. As such, master files database 306 includes all data necessary for computing a running balance. Moreover, master files database 306 may comprise an indicator for signifying whether or not a credit card account has a finance charge wavier period. The indicator may, in turn, comprise a data string with several different positions. For example, one such position may signify the length of a finance charge waiver period while another may signify whether the finance charge waiver period applies to debits arising from balance transfers. The table below demonstrates the structure of an indicator stored in database 306 having a data string with many different positions:

| FINCHG-DEFER Indicator | Valid Entries and Definitions |
| --- | --- |
| Position 1—Finance Charge Waiver Indicator | 0 Finance charge waiver not applicable<br>1 Finance charge waiver applicable/New account<br>2 Finance charge waiver applicable/Existing account<br>3 Finance charge waiver no longer applicable on new account<br>4 Finance charge waiver no longer applicable on existing account |
| Position 2—Finance Charge Waiver Active For Purchases? | N Finance charge waiver not active for purchases<br>Y Finance charge waiver active for purchases |
| Position 3—Waiver Period Length For Purchases | # Number of cycles for finance charge waiver period for purchases |
| Position 4—Finance Charge Waiver Active For Balance Transfers? | N Finance charge waiver not active for balance transfers<br>Y Finance charge waiver active for balance transfers |
| Position 5—Waiver Period Length For Balance Transfers | # Number of cycles for finance charge waiver period for balance transfers |

Referring again to FIG. 3, unbilled billing cycle file database 308 comprises data relating to transactions for which a finance charge waiver period will expire greater than one billing cycle hence. Thus, database 308 acts as a repository for those charges, consolidated by billing cycle, which are not yet billable. In relation to the conveyor belt analogy demonstrated in FIG. 1, database 308 would act as a repository for stored buckets 108. A description of an exemplary data structure for use with database 308 is provided below.

Billing computer 310 comprises a billing application 312 for carrying out a billing process. Billing application 312 may be implemented by software or code stored on a computer readable storage medium (such as internal memory or a disk). Billing application 312 receives data from databases 302, 304, 306, and 308 and compiles a billing statement for each credit card account. Once this process is completed, billing application 312 transmits information to current transactions database 302, master files database 306, and unbilled billing cycle files database 308 for storage and future use.

Although FIG. 3 illustrates databases 302, 304, 306, and 308 as separate database entities, these databases may be physically stored in the same database (such as account database 216 or 316). Similarly, all of the components represented in FIG. 3 may be contained within a single platform (such as credit card issuer 208 or 320), that has sufficient computing and storage capabilities.

Figure 4:
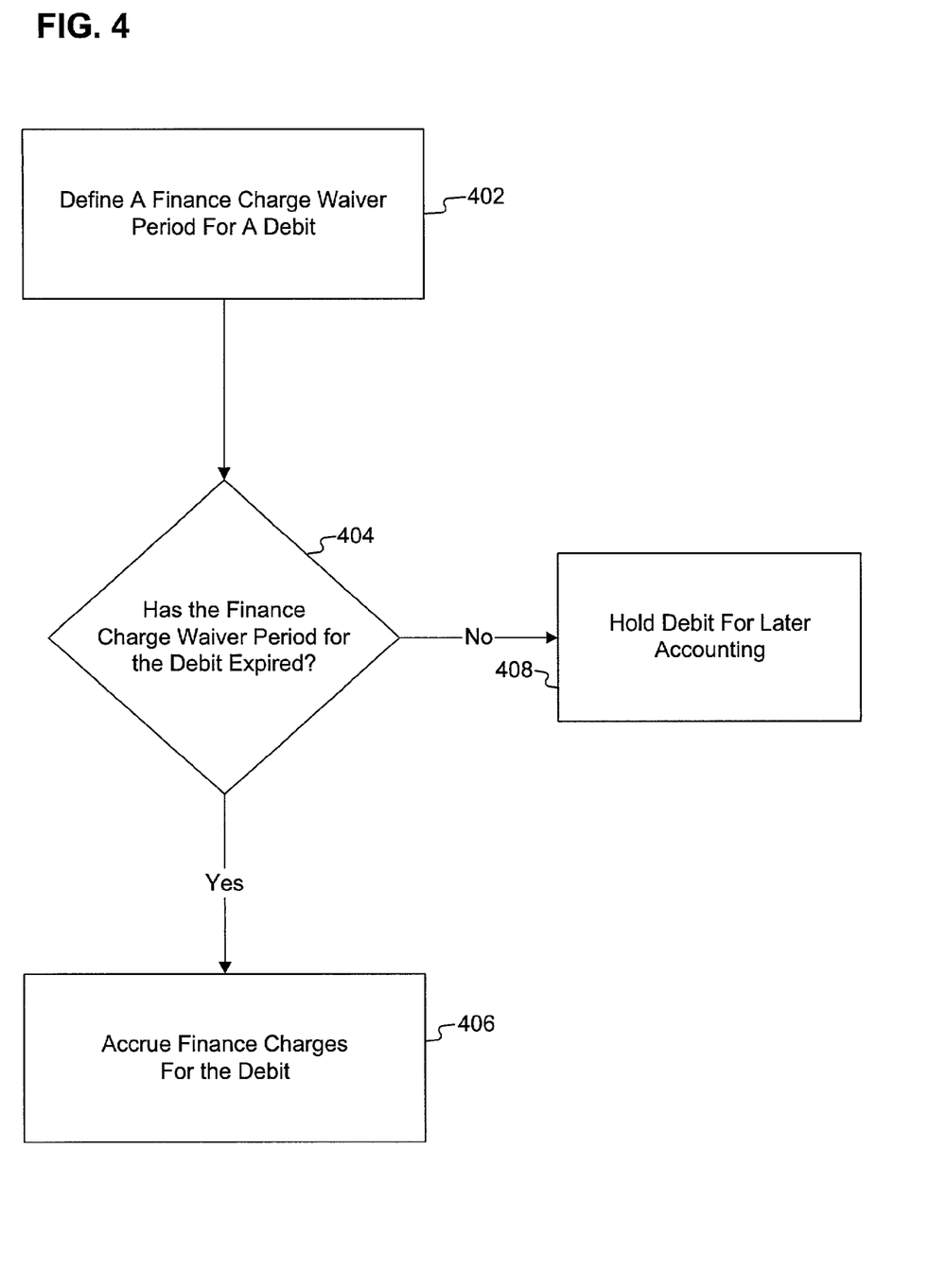
FIG. 4 is an exemplary flowchart of a process consistent with the principles of the present invention.

FIG. 4 illustrates an exemplary account management method in accordance with the principles of the present invention. The method of FIG. 4 may be applied to one or more debits made by a customer to a credit card account. In step 402, a finance charge waiver period is defined for a debit. Preferably, the finance charge waiver period will comprise more than one billing cycle. In step 404, a determination is made whether the finance charge waiver period for the debit has expired. If the finance charge waiver period has expired, finance charges will accrue against the debit, as illustrated in step 406. If the finance charge waiver period has not expired, the debit will be held for later accounting, as illustrated in step 408.

In accordance with the method of FIG. 4, finance charges may be calculated based on an average running daily balance in a billing cycle for all those debits for which the finance charge waiver period has expired. As the finance charge waiver period for a debit expires, it is added to a running daily balance of debits subject to finance charges. Finance charges are calculated based on an average running daily balance for a billing cycle.

To demonstrate the principles of the invention, an example of the method of FIG. 4 will now be described. Consider a finance charge waiver period comprising 90 days. According to the present invention, a finance charge waiver period for a purchase made on Jan. 14, 2001, will expire on Apr. 14, 2001. For dates up to and including Apr. 14, 2001, the debit will be held for later accounting. For dates after Apr. 14, 2001, finance charges will accrue against the debit.

Figure 5:
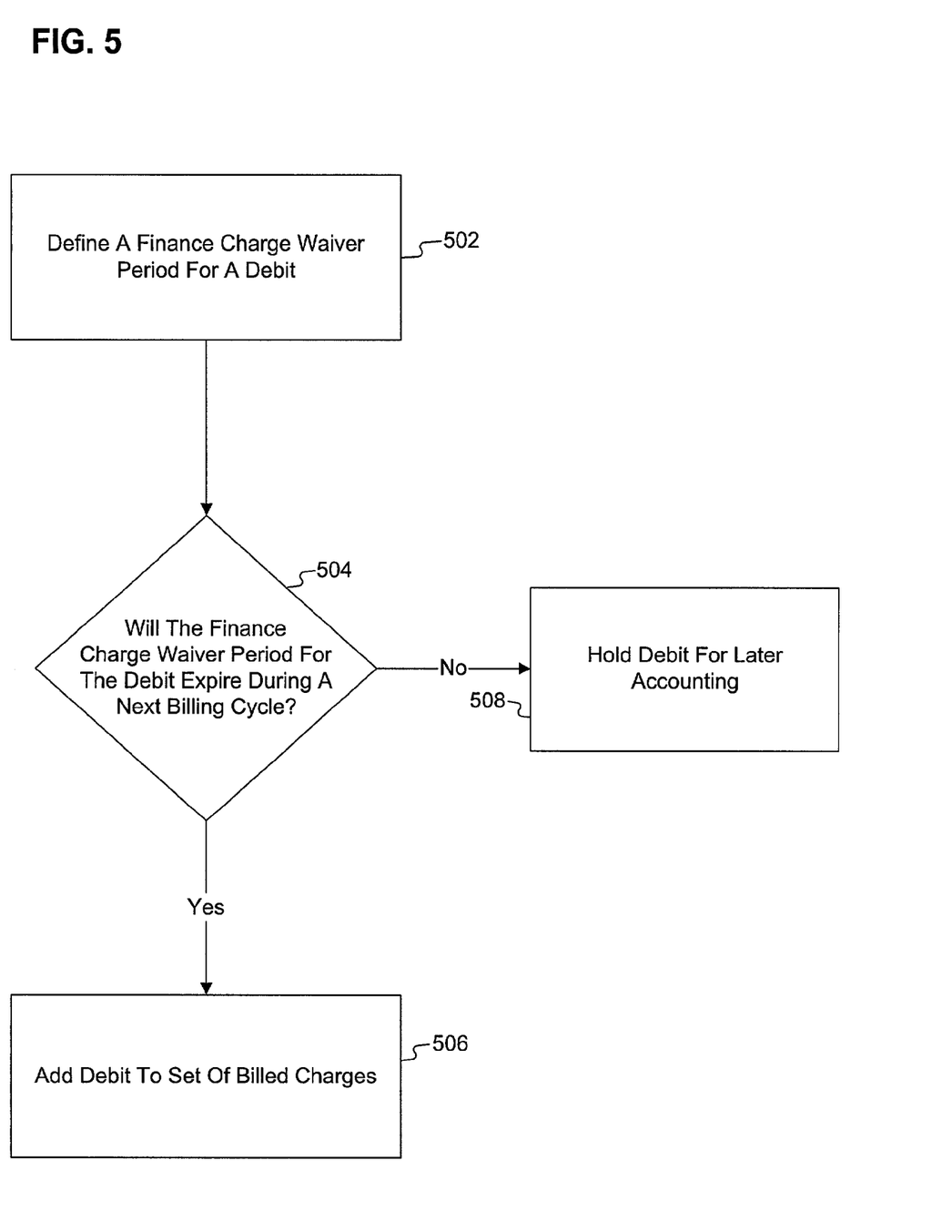
FIG. 5 is an exemplary flowchart of a process consistent with the principles of the present invention.

FIG. 5 illustrates another exemplary account management method, consistent with the principles of the invention. Once again, the method of FIG. 4 may be applied to one or more debits made by a customer to a credit card account. In step 502 of FIG. 5, a finance charge waiver period is defined for a debit. Preferably, the finance charge waiver period will comprise more than one billing cycle. In step 504, a determination is made whether the finance charge waiver period for the debit will expire during a next billing cycle. If the finance charge waiver period for the debit will expire during a next billing cycle, the debit is added to a set of billed charges, as illustrated in step 506. If the finance charge waiver period for the debit will not expire during a next billing cycle, the debit will be held for later accounting, as illustrated in step 508.

Thus, the method illustrated in FIG. 5 has the virtue of providing notice to a credit card account customer for debits which will soon be reaching the end of their respective finance charge waiver periods. This notice helps the credit card holder plan payments so as to avoid finance charges, for example. Furthermore, debits will not be added to a running daily balance of charges for finance charge calculations until their finance charge waiver period has expired.

To demonstrate the principles of the invention, an example consistent with the method of FIG. 5 will now be described. Consider again a finance charge waiver period comprising 90 days and a purchase made on Jan. 14, 2001. Also consider a billing cycle of approximately 30 days, each lasting a calendar month (e.g., January 1 through January 31). For a purchase made on Jan. 14, 2001, the finance charge waiver period will expire on Apr. 14, 2001. The set of billed charges for the January and February billing cycles will not reflect the January 14 purchase. However, for the March billing cycle, the January 14 purchase will become a billed charge, since the finance charge waiver period for the purchase will expire during the next billing cycle. In this way, a bill reflecting the January 14 purchase may be issued for the March billing cycle, thus giving a card holder notice of an upcoming finance charge waiver period expiration.

Figure 6:
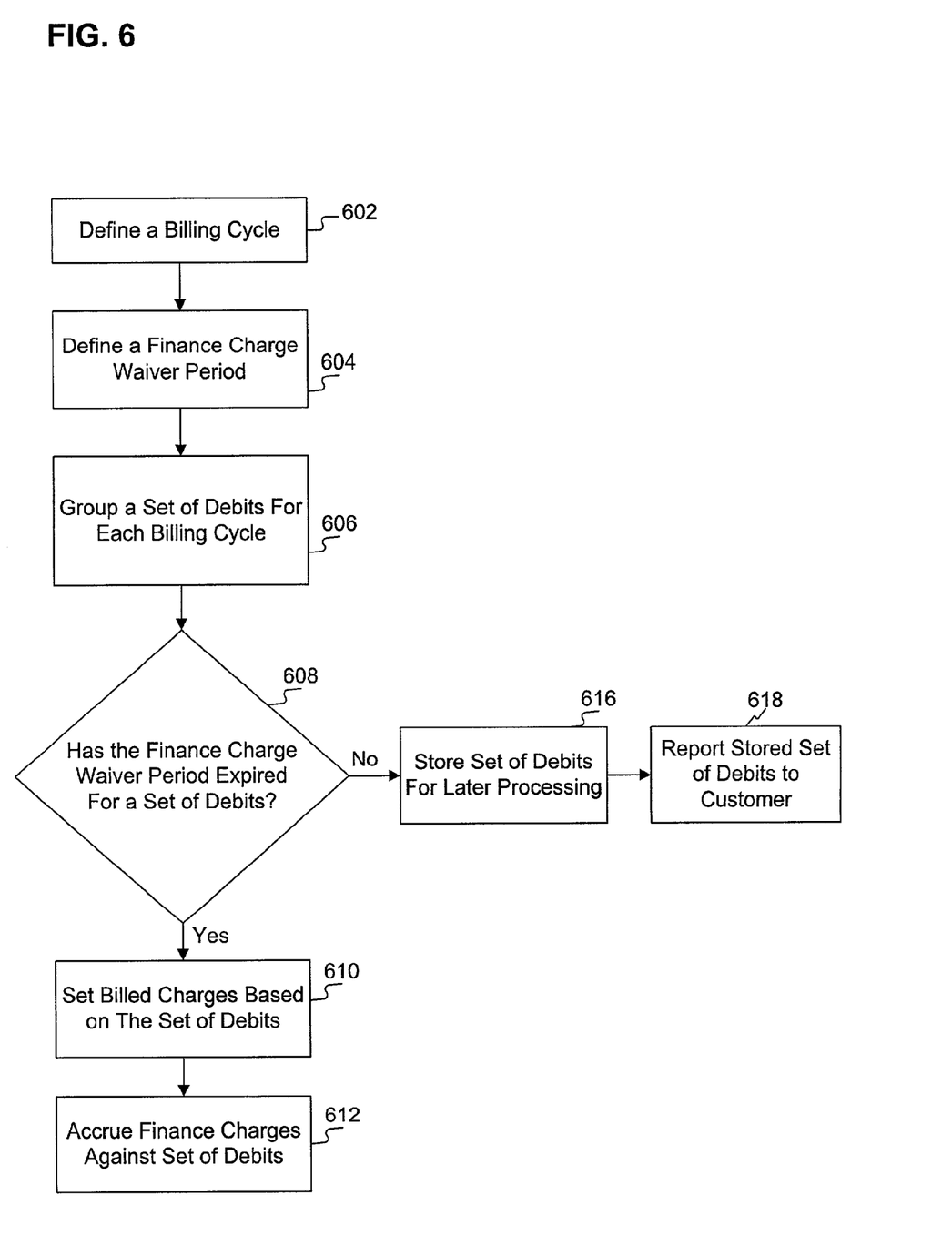
FIG. 6 is an exemplary flowchart of a process consistent with the principles of the present invention.

Turning to FIG. 6, another method of administering a credit card account is illustrated, consistent with the principles of the invention. In step 602, a billing cycle is defined for a predetermined number of days. For example, a typical billing cycle for a credit card account comprises 30 days. In step 604, a finance charge waiver period is defined, wherein the finance charge waiver period comprises more than one billing cycle. In step 606, a set of debits is grouped for each billing cycle. Thus, for example, all debits to the credit card account occurring within a single billing cycle are grouped and associated with the billing cycle. Moreover, the grouped debits may also be associated with an end date for their respective billing cycle.

Next, in step 608, a determination is made whether the finance charge waiver period for associated with each billing cycle group has expired. If so, billed charges are set based on each group of debits for which finance charge waiver period has expired, as illustrated in step 610. If not, the set of debits in the billing cycle group is stored in step 616 for later processing. Optionally, the set of debits which are stored may be reported to a customer, as shown in step 618.

Once billed charges have been set for the credit card account, finance charges may accrue against those groups of debits for which the finance charge waiver period has expired, as illustrated in step 612. Debits for which the finance charge waiver period has expired are added to a running daily balance for calculation of finance charges. Finance charges are calculated based on an average running daily balance during a billing cycle.

To further demonstrate the principles of the invention, an example consistent with the method of FIG. 6 will now be described. Consider a credit card having a billing cycle of 30 days which closes on the 30th of every month. Also consider a finance charge waiver period of four billing cycles (including a billing cycle in which a debit is posted) for all purchases posted to the account. This same waiver period may equivalently be termed as three billing cycles from the end of a current billing cycle. According to the present invention, a finance charge waiver period for a purchase made on Jan. 14, 2001 (or any day between January 1 and January 30), will expire on Apr. 30, 2001. No interest would be charged on that purchaser until after April 30. Therefore, finance charges will begin accruing against that debit starting on May 1. This simple example may be extended to a set of debits made during the timeframe of January 1 through January 30, wherein finance charges would accrue against the set of debits starting on May 1.

Systems consistent with the principles of the invention may be tailored to accommodate an extended finance charge waiver period, such as a finance charge waiver period of four billing cycles (including a billing cycle in which a debit is posted). In other words, the finance charge waiver period would start at the end of a billing cycle in which a debit was posted. The finance charge waiver period would then last three entire billing cycles (90 days). For example, an exemplary record layout for the unbilled billing cycle file database 308 of FIG. 3 is presented below:

| Data Field | Description |
| --- | --- |
| CPND-ACCT-NUM | Customer account number |
| CPND-PU-LAST-CYC | Purchase amount for last billing cycle (30 day balance) |
| CPND-DT-LAST-CYC | End date of last billing cycle |
| CPND-PU-2CYC-AGO | Purchase amount for 2 billing cycles ago (60 day balance) |
| CPND-DT-2CYC-AGO | End date for 2 billing cycles ago |
| CPND-PU-3CYC-AGO | Purchase amount for 3 billing cycles ago (90 day balance) |
| CPND-DT-3CYC-AGO | End date for 3 billing cycles ago |

The various data items indicated in the above table could be utilized by billing computer 310, and, more specifically, billing application 312, in calculating billable purchases and purchases subject to finance charges (i.e., those charges for which the finance charge waiver period has expired). The various data fields indicated in the above table can be modified to accommodate other extended finance charge waiver periods, such as periods that are less than four billing cycles or more than four billing cycles.

Figure 7:
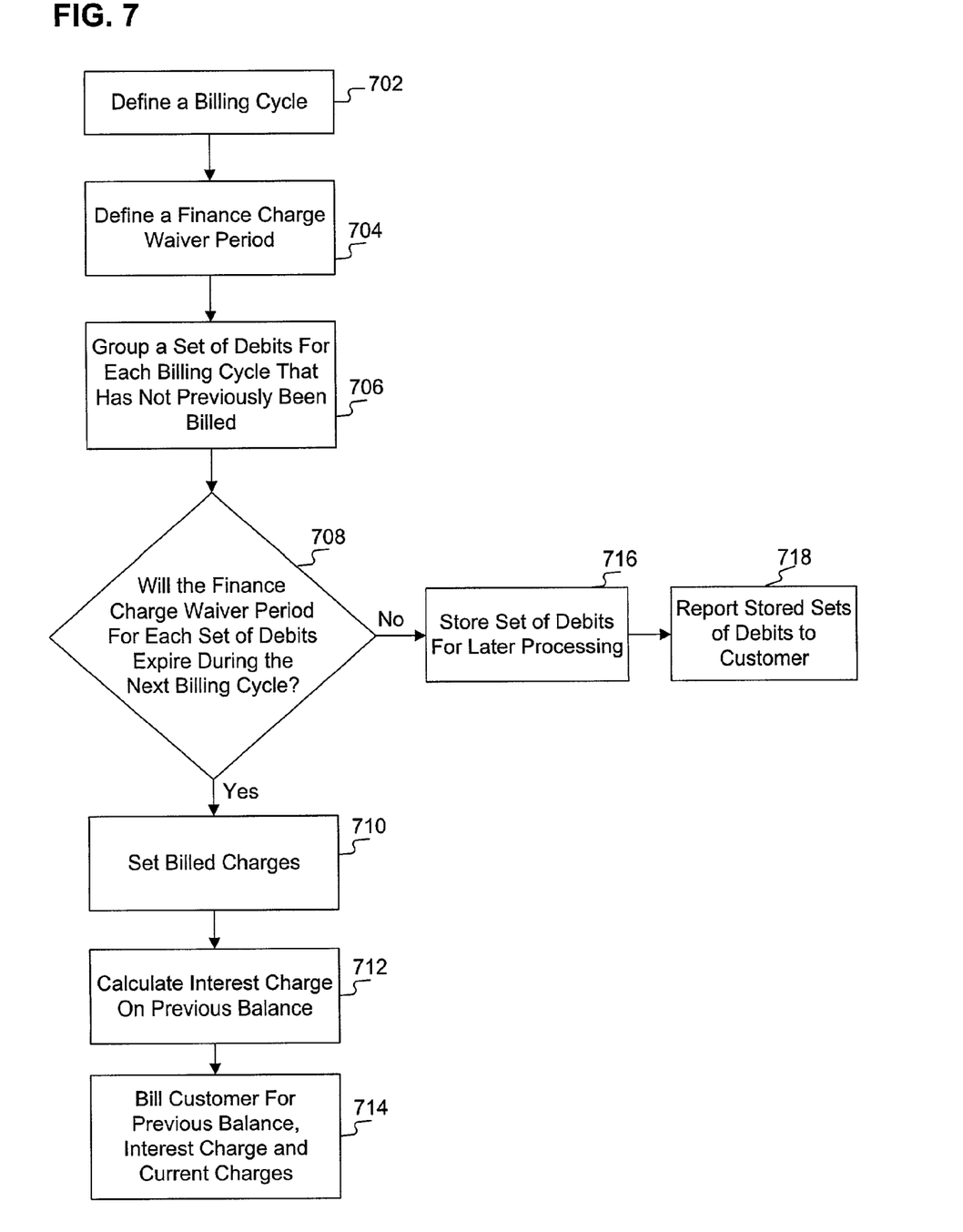
FIG. 7 is an exemplary flowchart of a process consistent with the principles of the present invention.

Turning to FIG. 7, another exemplary method of account management is illustrated, in accordance with the present invention. In step 702 of FIG. 7, a billing cycle is defined as a number of days. Again, an exemplary billing cycle for a credit card account comprises 30 days. In step 704, a finance charge waiver period is defined, wherein the finance charge waiver period comprises more than one billing cycle. In step 706, a set of debits is grouped for each billing cycle that has not previously been billed. Thus, for example, all debits to the credit card account occurring within a single billing cycle are grouped and associated with the billing cycle and/or an end date for the billing cycle.

Next, in step 708, a determination is made whether the finance charge waiver period associated with each billing cycle group will expire during the next billing cycle. If so, the debits associated with that billing cycle group are added to a set of billed charges, as illustrated in step 710. If not, the set of debits in the billing cycle group is stored in step 716 for later processing. Optionally, the set of debits that are stored may be reported to a customer, as shown in step 718.

Once billed charges have been set for the credit card account, a finance charge may be calculated on a previous balance, as illustrated in step 712. Additionally, the customer may be billed for the previous balance, the finance charges calculated in step 712, and the billed charges calculated in step 710. In this way, a statement may be sent to the customer via regular mail or electronic means, wherein a balance due is reported to the customer. Optionally, as shown in step 718, the bill may contain information relating to sets of debits that are stored but not yet billed to the credit card account. Therefore, as was the case in the method of FIG. 5, the method of FIG. 7 provides early notification of the sets of debits for which the finance charge waiver period will soon expire.

Again, finance charges only accrue against those sets of debits for which the finance charge waiver period has expired. Finance charges will not yet accrue against charges for which the finance charge waiver period will expire during a next billing cycle. Once the waiver period does expire, the debits are added to a running daily balance. Finance charges are based on an average of this running daily balance.

To demonstrate the principles of the invention, an example of the method of FIG. 7 will now be described. Consider a credit card having a billing cycle of 30 days which closes on the 30th of every month. Also consider a finance charge waiver period of four billing cycles (including a billing cycle in which a debit is posted) for all purchases posted to the account. In this example, a finance charge waiver period for a purchase made on Jan. 14, 2001 (or any day between January 1 and January 30), will expire on Apr. 30, 2001. The purchase will become billable on March 30, indicating to the customer that the debit must be paid off by April 30 to avoid interest charges on that debit. Thus, the credit card issuer will issue a bill some time shortly after March 30 requesting payment for the debit. No interest would be charged on that purchaser until after April 30. Thus, a customer must respond to the bill sent shortly after March 30 and pay off the debit by April 30 to avoid finance charges.

Prepayments (i.e., payments made to debits before the expiration of a finance charge waiver period) may be handled in various ways. For example, all payments may first be applied to any outstanding balance. Next, payments can be applied in first-in, first-out (FIFO) order, such that the debits that are the oldest which remain unpaid (and possibly unbilled) are paid off first.

Even if a cardholder carries a balance, interest will only be charged to those debits for which the finance charge waiver period has expired. This remains true even if a cardholder does not pay a minimum monthly payment. According to the present invention, the cardholder will always receive a finance charge waiver period for each set of debits, and no retroactive interest will ever be charged.

It should be noted that a finance charge waiver period may be applied to a purchase segment, a balance transfer segment, a fees segment, and/or any other defined segment of debits to a credit card account. Additionally, the length of the finance charge waiver period may vary among the different segments of debits.

The finance charge waiver period may be set to a specific number of days or billing cycles for each individual debit or as a specific number of days or billing cycles for a group of debits. When debits are grouped for applying the finance charge waiver period, the wavier period is applied in the same way for all debits within the group (for example, those debits in the same billing cycle). Any such grouping of charges may be devised, such as charges occurring over a number of days, of weeks, of months, of billing cycles, or any other grouping, when applying a finance charge waiver period, without departing from the scope of the present invention.

Alternatively, finance charges may be calculated based on an average running daily balance for all charges for which the finance charge waiver period is expiring at the end of a current billing cycle. For example, a debit for which the finance charge waiver period expires on April 30 may be included in the average running daily balance when it is prospectively billed on or after March 31. Thus, a cardholder must pay of the debit by April 30 or else the debit will be included in a finance charge calculation dating back to April 1.

It should be noted that the method of the present invention, which provides for a finance charge waiver period, need not be continuous and/or ongoing. For example, a credit card issuer may apply the finance charge waiver period only for those charges made during a promotional period, such as one, two, three, or any other number of billing cycles. In this case, a credit card account would revert back to known credit card functionality at the end of the promotional period.

Other embodiments of the invention will be apparent to those skilled in the art from consideration of the specification and practice of the invention disclosed herein. For example, consistent with the principles of the invention, accounts statements may be provided to customers that indicate the expiration date of the finance charge wavier period associated with each set of debits. In addition, customers may be given the option to designate which set of debits a prepayment should be applied to and/or whether a payment should only be applied to an outstanding balance. Moreover, retroactive interest charges may accrue against debits for which the finance charge waiver period has expired. Therefore, it is intended that the specification and examples be considered as exemplary only, with a true scope and spirit of the invention being indicated by the following claims.

What is claimed is:

1. A computer-implemented method of administering a credit card account, comprising:
   defining a finance charge waiver period for debits to the credit card account, the finance charge waiver period comprising more than one billing cycle;
   electronically determining, for each debit, whether a finance charge waiver period associated with the debit has expired; and
   electronically adding, to a set of billed charges, all debits for which the finance charge waiver period has expired, wherein finance charges accrue against all debits for which the finance charge waiver period has expired.

2. The method of claim 1 wherein the debits arise from at least one of a purchase segment, a balance transfer segment, a fees segment, or a cash advance segment.

3. The method of claim 2 wherein the finance charge waiver period is only provided for the purchase segment.

4. The method of claim 2 wherein the finance charge waiver period is only provided for the balance transfer segment.

5. The method of claim 2, further comprising:
independently setting a length of the finance charge waiver period for debits associated with a purchase segment, a balance transfer segment, a fees segment, and a cash advance segment.

6. The method of claim 1 wherein the finance charge waiver period comprises four billing cycles.

7. The method of claim 6 wherein the finance charge waiver period applies only to the one or more debits from a purchase segment.

8. The method of claim 1 further comprising:
receiving a payment for the credit card account; and
applying each payment to debits on a first-in, first-out (FIFO) basis.

9. A computer-implemented method of administering a credit card account, comprising:
defining a finance charge waiver period for debits to the credit card account, the finance charge waiver period comprising more than one billing cycle;
electronically determining, for each debit, whether a finance charge waiver period associated with the debit will expire during a next billing cycle; and
electronically adding, to a set of billed charges, all debits for which the finance charge waiver period will expire during the next billing cycle,
wherein a cardholder may pay off each debit by the end of the finance charge waiver period without incurring any finance charges on the one or more debits.

10. The method of claim 9 wherein a cardholder's failure to pay off one or more debits before the end of the finance charge waiver period results in finance charges based only on each of the one or more debits the cardholder did not pay off.

11. The method of claim 9 wherein the debits arise from at least one of a purchase segment, a balance transfer segment, a fees segment, or a cash advance segment.

12. The method of claim 11 wherein the finance charge waiver period is only provided for the purchase segment.

13. The method of claim 11 wherein the finance charge waiver period is only provided for the balance transfer segment.

14. The method of claim 9 wherein: the debits arise from more than one of a purchase segment, a balance transfer segment, a fees segment, or a cash advance segment, and a length of the finance charge waiver period varies among the more than one of a purchase segment, a balance transfer segment, a fees segment, or a cash advance segment.

15. The method of claim 9 wherein the finance charge waiver period comprises 90 days.

16. The method of claim 9 wherein the finance charge waiver period applies only to the one or more debits from a purchase segment.

17. The method of claim 9 further comprising:
receiving a payment for the credit card account; and
applying the payment to debits on a first-in, first-out (FIFO) basis.

18. A computer-implemented method of administering a credit card account comprising:
defining a billing cycle that comprises a predetermined number of days;
defining a finance charge waiver period that comprises more than one billing cycle;
electronically grouping, for each billing cycle, a billing cycle group including a set of debits to the account for a corresponding billing cycle;
electronically determining, for each billing cycle group, whether the finance charge waiver period associated with a the billing cycle has expired; and
electronically setting billed charges based on debits in billing cycle groups for which the finance charge waiver period has expired.

19. The method of claim 18 further comprising:
calculating finance charges for the billing cycle groups for which the finance charge waiver period has expired;
billing a customer for the billed charges and finance charges.

20. The method of claim 19 wherein the finance charges comprise retroactive interest charges.

21. The method of claim 18 further comprising:
providing a customer information relating to debits associated with the finance charge waiver period that will expire after a current billing cycle.

22. The method of claim 18 wherein the finance charge waiver period comprises three billing cycles from an end date of each billing cycle.

23. A computer-implemented system for administering a credit card account with a finance charge waiver period comprising more than one billing cycle, said system comprising:
one or more virtual transaction repositories, each of the virtual transaction repositories corresponding to a billing cycle and being associated with a billing cycle closing date, and each of the one or more virtual transaction repositories holding transaction data for one or more credit card transactions made during a corresponding billing cycle;
an outstanding balance repository for holding an outstanding balance comprising a total value of billable transactions plus interest and fees; and
calculation means for calculating balances, finance charges, and fees, the calculation means calculating a total value of billable transactions based on each of the one or more virtual transaction repositories for which the finance charge waiver period has expired and adding the total value of newly-billable transactions to the outstanding balance.

24. The system of claim 23 wherein the calculation means calculates interest on the outstanding balance.

25. The system of claim 24 wherein the calculation means calculates fees on the outstanding balance.

26. A computer-implemented system for administering a credit card account with a finance charge waiver period comprising more than one billing cycle, the system comprising:
a current transactions repository for holding raw transaction data for recent billing cycles;
a customer payment master file repository for holding customer data and billing data;
a financial master files repository for holding credit card account parameters;
an unbilled billing cycle file repository for holding data from billing cycles for which the finance charge waiver period has not yet expired; and
a billing computer comprising a billing application operatively connected to the current transactions repository, the customer payment master file repository, the financial master files repository, and the unbilled billing cycle file repository for calculating billed balances.

27. The system of claim 26 wherein the financial master files repository further comprises an indicator for signifying whether or not the credit card account has the finance charge wavier period.

28. The system of claim 27 wherein the indicator signifies the length of the finance charge waiver period.

29. The system of claim 28 wherein the indicator signifies a type of transaction for which the finance charge waiver period applies.

30. The system of claim 29 wherein the type of transaction is a purchase.

31. The system of claim 29 wherein the type of transaction is a balance transfer.

32. The system of claim 26 wherein the unbilled billing cycle file repository comprises data for billing cycles for which the finance charge waiver period has not yet expired.

33. The system of claim 32 wherein the unbilled billing cycle file repository comprises one or more billing cycle balances from billing cycles for which the finance charge waiver period has not yet expired.

34. The system of claim 33 wherein the unbilled billing cycle file repository comprises one or more billing cycle ending dates from billing cycles for which the finance charge waiver period has not yet expired.

35. A computer-implemented system for administering a credit card account with a finance charge waiver period comprising more than one billing cycle, said system comprising:

current transactions storage means for storing raw transaction data for recent billing cycles;

customer payment master file storage means for storing customer and billing data;

financial master files storage means for storing credit card account parameters;

unbilled billing cycle file storage means for storing data from billing cycles for which the finance charge waiver period has not yet expired; and computation means operatively connected to the current transactions storage means, the customer payment master file transactions storage means, the financial master files transactions storage means, and the unbilled billing cycle file transactions storage means for computing billed balances.

36. The system of claim 35 wherein the financial master files storage means further comprises indicator means for indicating a length of the finance charge waiver period.

37. The system of claim 36 wherein the indicator means indicates segments of debits for which the finance charge waiver period applies.

38. The system of claim 35 wherein the unbilled billing cycle file storage means stores data for billing cycles for which the finance charge waiver period has not yet expired.

39. The system of claim 38 wherein the unbilled billing cycle file storage means stores one or more billing cycle balances from billing cycles for which the finance charge waiver period has not yet expired.

40. The system of claim 39 wherein the unbilled billing cycle file storage means stores one or more billing cycle ending dates from billing cycles for which the finance charge waiver period has not yet expired.

\* \* \* \* \*